United States Patent
Song et al.

(10) Patent No.: US 8,377,545 B2
(45) Date of Patent: Feb. 19, 2013

(54) BONDED ARTICLE WITH NANOSCOPIC DENDRIMERS AND METHOD OF PREPARING SAME

(75) Inventors: Guiqin Song, Milton (CA); T. Brian McAneney, Burlington (CA); Nan-Xing Hu, Oakville (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 655 days.

(21) Appl. No.: 12/562,843

(22) Filed: Sep. 18, 2009

(65) Prior Publication Data

US 2011/0070414 A1    Mar. 24, 2011

(51) Int. Cl.
*B32B 3/00* (2006.01)
(52) U.S. Cl. .......... 428/211.1; 428/195.1; 428/201; 428/203; 428/332; 428/407
(58) Field of Classification Search ........ 428/195.1, 428/201, 203, 211.1, 332, 407
See application file for complete search history.

(56) References Cited

U.S. PATENT DOCUMENTS

| | | | |
|---|---|---|---|
| 6,673,192 B1 * | 1/2004 | Woods et al. | 156/314 |
| 6,924,347 B2 * | 8/2005 | Morgan et al. | 528/65 |
| 2007/0213457 A1 * | 9/2007 | Liu et al. | 524/591 |

OTHER PUBLICATIONS

Hummelen et al., "Electrospary Mass Spectrometry of Poly(propylene imine) Dendrimers—The Issue of Dendritic Purity or Polydispersity," Chem. Eur. J., 3, 1489-1493, 1997.
Mengerink, Non-Exclusion Separation Techniques for Polyamides, Ph.D Thesis, Eindhovenn University of Technology, 2001.

* cited by examiner

*Primary Examiner* — Gerard Higgins
*Assistant Examiner* — Christopher Polley
(74) *Attorney, Agent, or Firm* — MH2 Technology Law Group LLP

(57) ABSTRACT

Exemplary embodiments provide materials and methods for bonded articles using dendrimers for facilitating adhesion between an adhesive and a substrate with low surface free energy.

17 Claims, 3 Drawing Sheets

BONDED ARTICLE WITH NANOSCOPIC DENDRIMERS AND METHOD OF PREPARING SAME

FIELD OF USE

The present teachings relate generally to bonded articles used in electrostatographic printing and imaging systems and, more particularly, to bonded articles using dendrimers as an adhesive promoter.

BACKGROUND

Xerographic digital presses, for example, the Xerox iGen3, have been used for production of publications including books-on-demand, brochures, and manuals. These publications often require bookbinding which can be accomplished by, for example, applying a hot melt adhesive between binding surfaces.

In a typical imaging or printing process, a latent image is formed upon a photosensitive member (e.g., photoreceptor), and the latent image is subsequently rendered visible by the application of resin and pigment particles, or toner. The visible toner image is in a loose powdered form and can be easily disturbed or destroyed. The toner image is usually fixed or fused upon a substrate, which may be a substrate sheet of a plain paper, using a fuser roll.

To ensure and maintain good release properties of the fuser roll, release agents are applied during the fusing operation. Typically, these release agent materials are applied as thin films of, for example, nonfunctional silicone oils or mercapto- or amino-functional silicone oils, to prevent toner offset on to the fuser roll.

Problems arise, however, because xerographic prints are unavoidably contaminated by the release agents during fusing. The trace amount of release agents significantly reduces surface free energy of the prints and cause poor adhesion or separation between the prints and hot melt adhesives that is usually used in the art. For example, the surface free energy (SFE) of xerographic prints, as estimated by Lewis Acid-Base method, may range from 10 to 25 mN/m for most of printed substrates, while most of commercially available hot melt adhesives, however, work only for a substrate or print having a SFE of at least about 30 mN/m.

Thus, there is a need to overcome these and other problems of the prior art and to provide a bonded article and its method using dendrimers to facilitate adhesion between an adhesive and a substrate or a print that has low surface free energy.

SUMMARY

According to various embodiments, the present teachings include a bonded article. The bonded article can include an adhesive and a substrate. The bonded article can also include at least one type of dendrimer having one or more amino end groups. The dendrimer can be incorporated with the adhesive to at least partially cover the substrate.

According to various embodiments, the present teachings also include a bonded article. The bonded article can include a substrate and a hot melt adhesive that includes an adhesive promoter at least partially covering the substrate. The adhesive promoter can include at least one type of dendrimer having an amino end group.

According to various embodiments, the present teachings further include a method for forming a bonded article. In this method, a substrate can first be provided and at least partially covered by a release agent. A liquid adhesive primer can then be applied to the at least partially covered substrate to form an adhesive primer. The liquid adhesive primer can include a dendrimer having an amino end group. A hot melt adhesive can further be applied to the substrate on the adhesive primer such that the hot melt adhesive is firmly adhered to the substrate.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
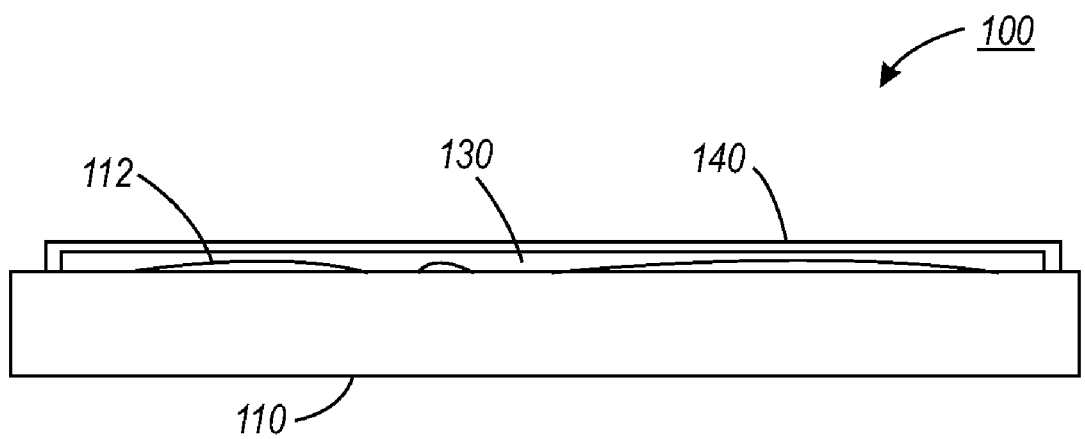
FIGS. 1-1A illustrate an exemplary bonded article in accordance with various embodiments of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for bonded articles using dendrimers for facilitating adhesion between an adhesive and a substrate. The substrate may have a low surface free energy (SFE) that inhibits adherence of the adhesive. For example, the SFE can be less than about 35 mN/m, or less than about 25 mN/m, or less than about 20 mN/m. The bonded article can be used with electrostatographic printing and imaging systems.

In embodiments, at least one type of dendrimer can be incorporated with the adhesive, for example, as an adhesive promoter, to at least partially cover the substrate such that the adhesive can be firmly adhered to the substrate. As disclosed herein, the term "firmly" describes an adhesion strength between two surfaces of, for example, the adhesive and the substrate. When the adhesive is "firmly" adhered to the substrate, a fiber tear of at least about 70% can be required to separate the adhesive and the substrate.

Specifically, in some embodiments, the incorporation of the adhesive promoter (i.e., at least one type of dendrimer) with the adhesive can include an adhesive primer (also referred to as a "dendrimer layer") disposed between the adhesive and the substrate such that the adhesive can be firmly adhered to the substrate. In other embodiments, the incorporation of the adhesive promoter of the at least one type of dendrimer with the adhesive can include mixing dendrimer(s) with the adhesive to form a promoted adhesive firmly adhered on the substrate.

In various embodiments, dendrimers used for the adhesive primer and/or the promoted adhesive can include highly branched macromolecules with monodisperse, tree-like structure or generational structures. The dendrimer can include an interior dendritic structure and an exterior surface having a great number of end groups, which can be functionalized with tailored groups to ensure compatibility and reactivity of the dendrimer. Exemplary end groups can include hydroxyl, thiol, amino, succinamic or epoxy groups.

The exterior of the dendrimers can thus have one or more reactive sites and a number of branching layers of chain extending molecules and optionally a layer of one or more chain terminating molecules. The layers can be referred to as "generations." In an exemplary embodiment, the dendrimer can include about 1 generation to about 5 generations. In general, dendrimers can have an average of at least 16 end groups per molecule for $2^{nd}$ generation materials, increasing by a factor of at least 2 for each successive generation. In embodiments, the molecular weight of the dendrimers can be about 100 g/mol per end group, although this can vary according to the exact formulation. In embodiments, dendrimers can include hyperbranched polymers.

Because of their compact, tree-like molecular structure, dendrimers can provide a rich source of surface functionality, for example, to build blocks and carrier molecules at nanometer level. Dendrimers can also be used in, such as, for example, coatings, inks, adhesives, because of the interior dendritic structure and the exterior surface of functional end groups.

In embodiments, the dendrimers used for the adhesive primer and/or the promoted adhesive can include one or more types of dendrimers chosen from, for example, polypropylenimine (POPAM) dendrimers, polyamidoamine (PAMAM) dendrimers, polyetherhydroxyamine dendrimers or mixtures thereof. In embodiments, the dendrimers used herein can include amine-terminated dendrimers including, for example, primary amino functional end/surface groups ($—NH_2$).

In various embodiments, the exemplary dendrimers can include, for example, a generation 2 dendrimer with sixteen amino end groups, a generation 3 dendrimer with 32 amino end groups, and a generation 4 dendrimer with 64 amino end groups, although other dendrimers may be used.

In embodiments, the adhesive primer containing dendrimers and/or the promoted adhesive containing dendrimers can be formed on any type of substrates.

As disclosed herein, the term "substrate" refers to any printable substrate, such as, for example, paper, plastic film, pre-printed form, transparency, cardboard, etc. In embodiments, the substrate can be a xerographic print exiting from a fusing process and may have a residue of fuser-oil (e.g., functionalized silicone oil) to completely or partially wet the surface. In various embodiments, the substrate can contain additives including anti-curl compounds, such as, for example, trimethylolpropane, biocides, humectants, chelating agents, and mixtures thereof and any other optional additives known in the art for enhancing the performance and/or value of the toner and/or substrate. In embodiments, the substrate may include a surface area or a surface portion having a SFE in an amount that does not allow an adhesive, for example, a hot melt adhesive, to adhere to.

In various embodiments, the substrate can include an imaged area and/or a non-imaged area. In embodiments, release agents or fuser oils can be on a surface portion of the substrate, imaged or non-imaged. However, substrates with no images formed thereon or substrates with no release agents attached thereon can also be included in the present teachings.

FIG. 1 depicts an exemplary bonded article 100 in accordance with various embodiments of the present teachings. It should be readily apparent to one of ordinary skill in the art that the article 100 depicted in FIG. 1 represents a generalized schematic illustration and that other components can be added or existing components can be removed or modified.

As shown, the bonded article 100 can include a substrate 110 having release agents 112 attached thereon, an adhesive 140 at least partially covering the substrate 110, and an adhesive primer 130 disposed between the adhesive 140 and the release agents on the substrate.

The substrate 110 refers to any media that can be printed on, for example, paper, plastic film, pre-printed form, transparency, cardboard, etc. The substrate 110 can be any type of substrates as disclosed herein.

As explained above, release agents 112 can be useful for releasing a substrate from a fuser roll found in an imaging device, e.g., an electrophotographic device or an electrostatographic device, after the toner image has been formed on the substrate, for example, the substrate 110. Some release agent 112 may remain on the toner image (not illustrated), which may cover any portion of the substrate 110, and may remain on the substrate 110 itself. In other words, the release agent 112 may at least partially cover the substrate 110 having no toner image or having a toner image thereon. "Partially" refers to the release agent 112 covering from, about 1 percent to about 100 percent of the substrate 110, for example from about 10 percent to about 100 percent or from about 10 percent to about 90 percent of the substrate 110.

The release agents 112 used in releasing the substrate 110 from a fuser roll in an imaging device can include, for example, functionalized and nonfunctionalized silicone oil. If a functionalized silicone oil is used, the functional group may be an amino group, a mercapto group or the like. In various embodiments, the release agent can be deposited in amount of from about 0 to about 25 mg per copy, or from about 0 to about 20 mg per copy or from about 1 to about 18 mg per copy using an 8½ inch by 11 inch page.

In embodiments, the release agents 112 can include, but are not limited to, poly-organofunctional siloxanes, for example, amino-functional silicone oils, methyl aminopropyl methyl siloxane, ethyl aminopropyl methyl siloxane, benzyl aminopropyl methyl siloxane, dodecyl aminopropyl methyl siloxane, aminopropyl methyl siloxane, and the like.

When exiting the fuser after a printing or imaging process, the substrate 110, for example, a xerographic print, may thus include the release agents 112, for example, silicone fuser oil thereon. The amino functional release agent may chemically bond to the surface of the prints or printed substrates 110 because of the high pressure and high temperature of the fusing process. The surface free energy (SFE) of the xerographic prints, or the SFE of a surface having release agents 112 on the substrate 110, can thus dramatically drop from a range of higher than 30 mN/m to a range of from about 10 mN/m to about 25 mN/m. Generally, commercially available hot melt adhesives, for example, those used for the adhesive 140, can only bind to substrates having a SFE higher than 30 mN/m.

The presence of release agents 112 on the substrate 110, with or without a toner image thereon, can thus be detrimental to the ability of an adhesive to adhere to the substrate. This is particularly problematic when the substrate is to be laminated or coated with a hot melt adhesive, for example, an adhesive used in bookbinding. The release agents 112 can also prevent other materials utilizing adhesives from adhering to another substrate, for example a POST-IT® note, to the substrate 110.

The adhesive primer 130 containing dendrimers can be applied to the substrate 110 having no toner image or having a toner image thereon, either of which can be at least partially covered by the release agents 112. By applying the adhesive primer 130, the SFE of the substrate 110 having no toner image or having a toner image thereon can be increased to the desired range of at least about 30 mN/m, or in some cases, at least about 35 mN/m. Increasing the SFE of the substrate 110 can allow the adhesive 140 subsequently to be effectively applied to the substrate 110.

In various embodiments, the adhesive primer 130 can also promote adhesion of the adhesive 140 to the substrate 110, having no toner image and/or having a toner image, without being covered by the release agents 112.

In various exemplary embodiments, the adhesive primer 130 can include one or more dendrimer materials including, for example, polypropylenimine tetramine dendrimer (DAB (PA)$_4$) with 1 generation, polypropylenimine tetrahexacontaamine dendrimer DAB(PA)$_{64}$ with 5 generations, starburst PAMAM dendrimer having ethylenediamine core/interior with generation 0.0 solution, polyetherhydroxyamine dendrimer with 1 generation having amine functionality, or mixtures thereof.

In embodiments, the adhesive primer 130 containing dendrimers can have a thickness of about 0.1 micron to about 5 microns on the substrate 110. In other embodiments, the adhesive primer 130 can have a thickness of about 0.5 micron to about 2 microns, or in some case, the thickness can be about 0.5 micron to about 1 micron.

In various exemplary embodiments, the adhesive primer 130 containing dendrimers can promote the adhesion of the adhesive 140 to the substrate 110 that has lowered glue adherence, i.e., gluability, which can, in some cases, stem from the extremely low surface tension of release agents 112 typically used in xerographic print engines. In addition, glue adhesion is generally worse on substrates having a low SFE.

The adhesive 140 can include, for example, a hot melt adhesive, a pressure sensitive adhesive and/or their combination that used in the art of xerography. Suitable exemplary hot melt adhesives that can be used herein can include commercially available hot melt adhesives, such as, for example, polyparaffin, polyacrylate, polyester, poly(ethylene/vinyl acetate), polystyrene, polyamide, polyvinyl acetate, polyvinyl alcohol, polyalkylene oxide, natural rubber, phenol-formaldehyde resin of polymer or block copolymer based hot melt adhesive. In embodiments, exemplary block copolymer based hot melt adhesive can include a tackifier, a wax, a plasticizer and/or an antioxidant.

Figure 1A:
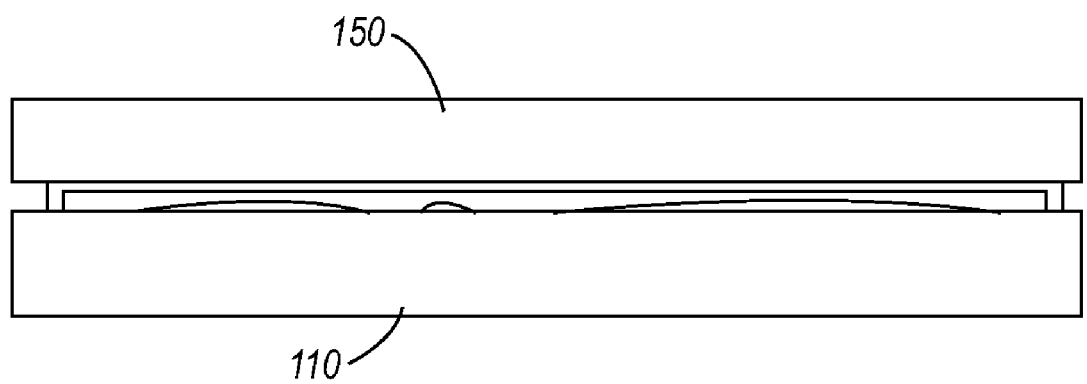

In this manner, the adhesive primer 130 containing dendrimers can be useful in many publishing applications involving processes of, for example, bookbinding using hot melt adhesives 140 to provide adhesion of the pages to the spine of a second substrate 150 for example, book, magazine or the like shown in FIG. 1A.

Figure 2:
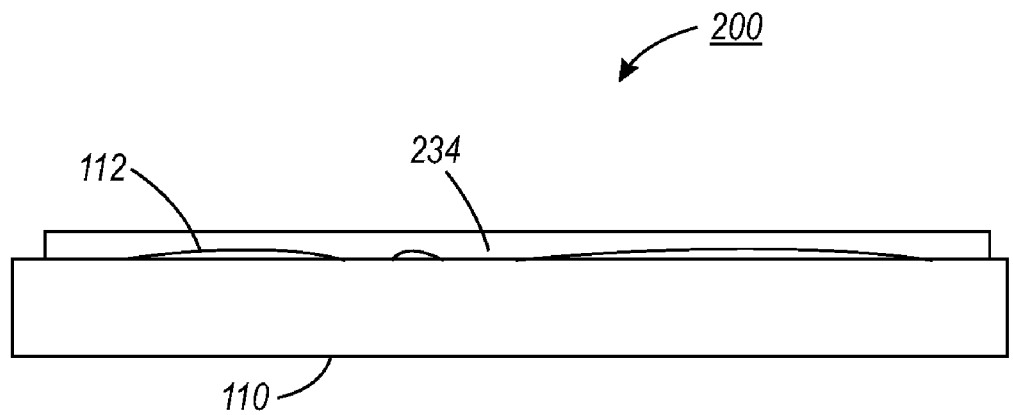
FIGS. 2-2A illustrate another exemplary bonded article in accordance with various embodiments of the present teachings.

FIG. 2 depicts another exemplary bonded article 200 in accordance with various embodiments of the present teachings. It should be readily apparent to one of ordinary skill in the art that the article 200 depicted in FIG. 2 represents a generalized schematic illustration and that other components can be added or existing components can be removed or modified.

As shown, the bonded article 200 can include a substrate 110 having release agents 112 attached thereon, and a promoted adhesive 234 at least partially covering the substrate 110 as desired, for example, on a portion with or without toner image thereon and/or on a portion with or without release agents thereon. In various embodiments, the substrate 110, and the release agent 112 can be the same or similar to the substrate and the release agent as described in FIGS. 1-1A.

In various embodiments, the promoted adhesive 234 can be, e.g., a mixture including an adhesive, such as the exemplary hot melt adhesive 140 illustrated and described in FIG. 1, and the disclosed dendrimers or materials used for the adhesive primer of the article 100 as illustrated and described in FIG. 1.

In various exemplary embodiments, the promoted adhesive 234 can include one or more dendrimer materials including, for example, polypropylenimine tetramine dendrimer (DAB (PA)$_4$) with 1 generation, polypropylenimine tetrahexacontaamine dendrimer DAB(PA)$_{64}$ with 5 generations, starburst PAMAM dendrimer having ethylenediamine core/interior with generation 0.0 solution, polyetherhydroxyamine dendrimer with 1 generation having amine functionality, or mixtures thereof.

In various embodiments, the promoted adhesive 234, including a mixture of desired adhesives with the disclosed dendrimers as adhesion promoters, can be applied to the substrate 110 having no toner image or having a toner image thereon, either of which can be at least partially covered by the release agent 112. In various embodiments, the promoted adhesive 234 can also be applied to the substrate 110 with no release agent 112 attached thereto, disregarding if the substrate 110 has toner images thereon or not.

In embodiments, the promoted adhesive 234 can have a thickness of from about 0.1 micron to about 10 microns on the substrate 110. In other embodiments, the promoted adhesive 234 can have a thickness of from about 0.5 micron to about 5 microns or in some case, the thickness can be from about 0.5 micron to about 2 micron, although other thicknesses can be used.

In embodiments, the promoted adhesive 234 can include dendrimers in an amount of, for example, from about 0.1% to about 10% by weight of total promoted adhesive. In an additional example, the dendrimers can be present in an amount of from about 0.5% to about 5% by weight, or in some case, from about 1% to about 2% by weight of total promoted adhesive on the substrate 110.

Figure 2A:
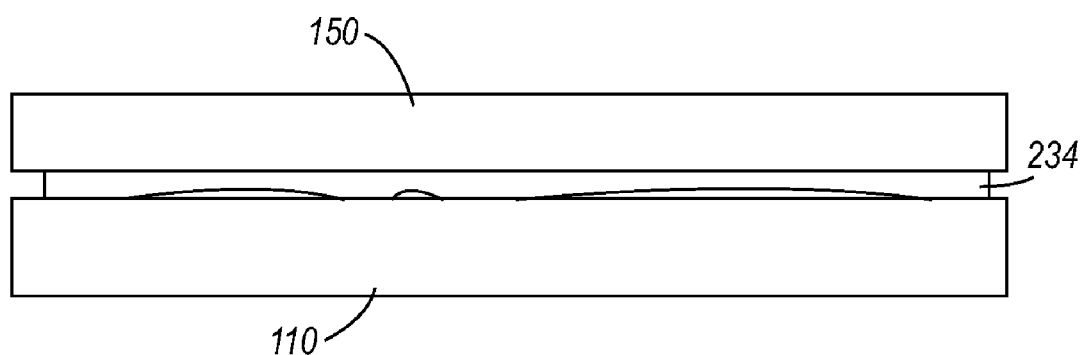

In various embodiments, a second substrate 150, for example, a book, magazine or the like, can be applied to the promoted adhesive 234 for a process of, such as bookbinding to provide adhesion of the pages to the spine of the second substrate 150 as shown in FIG. 2A. In embodiments, the second substrate 150 can be formed of a material selected from the group consisting of plastic, polyethylene, polypropylene, polyvinyl chloride (PVC), and polyester.

In certain embodiments, the substrate 110 of FIGS. 1, 1A, 2, and 2A can be a book cover bonded to a second substrate 150 of a block of paper.

Figure 3:
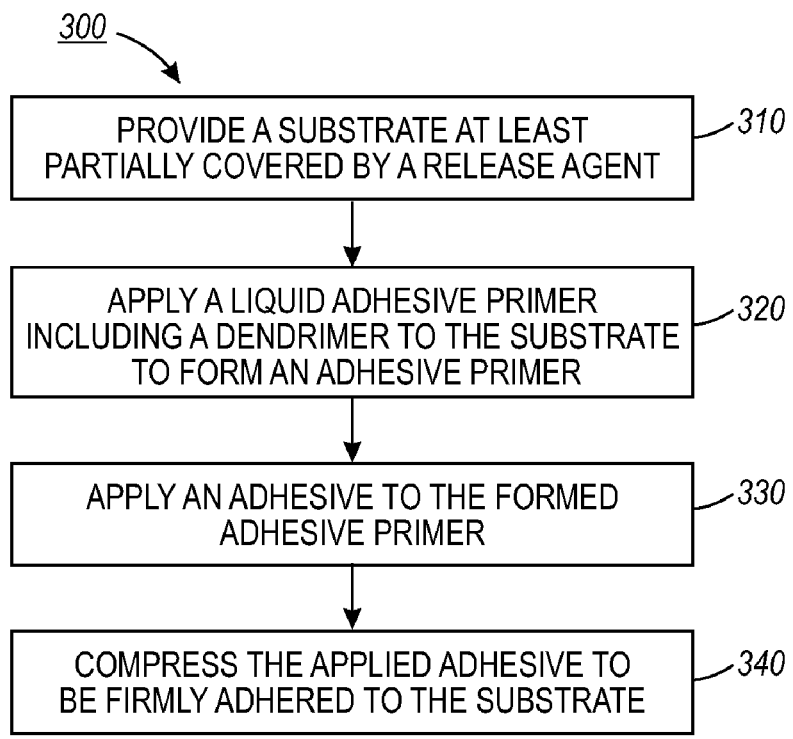
FIG. 3 illustrates an exemplary method for forming a bonded article in accordance with various embodiments of the present teachings.
Figure 4:
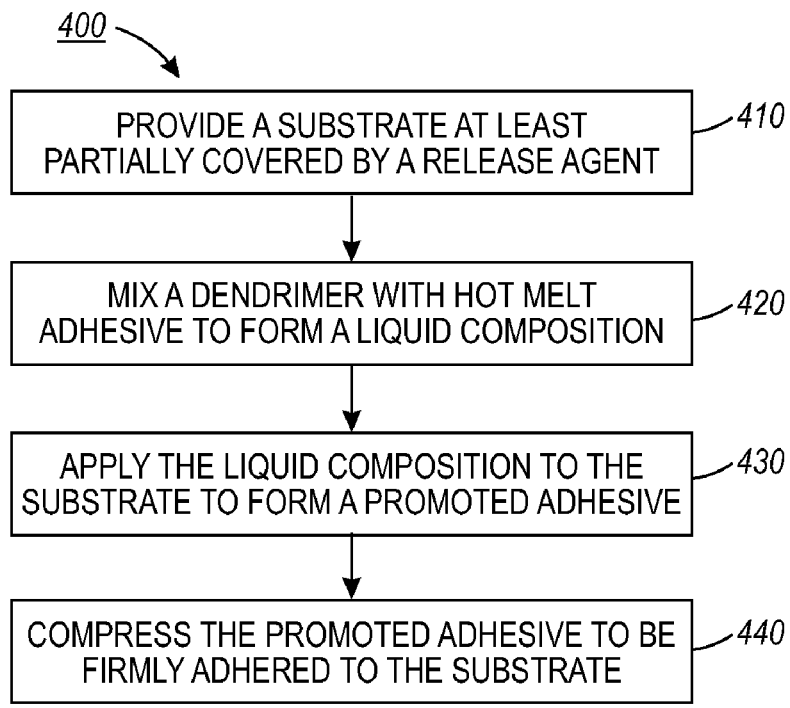
FIG. 4 illustrates another exemplary method for forming a bonded article in accordance with various embodiments of the present teachings.

FIGS. 3-4 depict various methods for making the disclosed bonded articles in accordance with various embodiments of the present teachings.

While the exemplary method 300 or 400 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings.

In embodiments, the method 300 depicted in FIG. 3 can be related to the formation of the article 100 shown in FIGS. 1-1A, while the method 400 depicted in FIG. 4 can be related to the formation of the article 200 shown in FIGS. 2-2A in accordance with various embodiments of the present teachings.

As shown in FIG. 3, at 310, a substrate as disclosed herein can be provided. For example, the substrate can be a xerographic print after image formation and after the image is substantially fused on a print medium or a paper sheet. In embodiments, the substrate can be at least partially covered by a release agent or can have a residue of a release agent (e.g., functionalized silicone oil). The substrate can have a low surface free energy (SFE) of less than about 35 mN/m or less than about 30 mN/m. The substrate does not allow an adhesive to adhere thereto due to its surface properties.

At 320, a liquid adhesive primer can be applied to the provided substrate with low SFE. The liquid composition can include one or more dendrimers that each includes one or more amino functional end groups.

In various embodiments, the liquid adhesive primer as applied can have a viscosity ranging from about 1 cp to about $1.5 \times 10^7$ cps, or from about 5 cps to about $5 \times 10^6$ cps or from about 10 cps to about $2 \times 10^6$ cps at room temperature, for example, approximately about 22° C. to about 27° C.

In various embodiments, the liquid adhesive primer can include a solvent of, for example, water, methanol, and/or isopropanol. In embodiments, the dendrimers can present in an amount ranging from about 0.1% to about 20% by weight of the liquid adhesive primer, or from about 0.1% to about 15% or from about 1% to about 10% by weight of the liquid adhesive primer.

In various embodiments, the applied liquid adhesive primer can then be dried to form a layer of adhesive primer to at least partially cover the substrate provided at 310. The dried adhesive primer on the provided substrate can have a desired thickness as described for the adhesive primer 130 of FIG. 1.

At 330, an adhesive can then be applied to the adhesive primer, as applied or as dried, and subsequently be compressed at 340, for example, by laminators known to one of ordinary skill in the art, such that the adhesive can be firmly adhered to the substrate through the adhesive primer. In various embodiments, a second substrate can then be applied to the firmly adhered adhesive such that the second substrate can be bonded to the substrate via the adhesive primer and the adhesive.

In embodiments, the adhesive can be applied to the substrate having the adhesive primer thereon immediately after application of the adhesive primer. In embodiments, the adhesive can be applied to the substrate having the adhesive primer thereon once the adhesive primer is completely dried, for example, when the adhesive primer is dried to touch. The adhesive can be applied to the substrate by any known methods.

In various embodiments, referring to FIG. 4, at 410 a substrate, such as the substrate described in FIGS. 1-3 can be provided. At 420, a liquid promoted adhesive can be formed by mixing one or more dendrimers with one or more exemplary hot melt adhesives. The dendrimers can include at least an amino functional end group and can be used as an adhesion promoter to promote the adherence of the hot melt adhesive with the provided substrate.

At 430, the formed liquid promoted adhesive can then be applied to at least partially cover the provided substrate.

In various embodiments, the liquid promoted adhesive as applied can have a viscosity ranging from about 1000 cps to about 20000 cps, or from about 3000 cps to about 10000 cps or from about 4500 cps to about 6000 cps at room temperature of approximately about 22° C. to about 27° C.

In various embodiments, the applied liquid promoted adhesive can then be dried to form a promoted adhesive to at least partially cover the substrate provided at 410.

At 440, the dried promoted adhesive can subsequently be compressed, for example, by laminators known to one of ordinary skill in the art, such that the adhesive can be firmly adhered to the substrate through the promoted adhesive. In various embodiments, a second substrate can be applied to the firmly adhered adhesive such that the second substrate can be bonded to the provided substrate via the promoted adhesive.

In various embodiments, the step 320 of FIG. 3 and/or the step 430 of FIG. 4 can both include applying a liquid composition to the provided substrate.

In various embodiments, the liquid compositions of the adhesive primer containing dendrimers and/or the promoted adhesive containing dendrimers can be applied to the substrate at any suitable time after image formation and/or after the image is substantially fused. For example, such liquid composition can be applied to the substrate immediately after the image is fused, such as in an inline coating apparatus where the image printing and overcoating are conducted by the same printing device, or after a short or long delay after printing, for example, in an offline coating apparatus where the image printing and overcoating are conducted by different printings devices.

In embodiments, the liquid compositions of the adhesive primer containing dendrimers and/or the promoted adhesive containing dendrimers can be applied to the image substrate having a toner image thereon after it exits the fuser of a xerographic machine. In various embodiments, the liquid compositions of the adhesive primer containing dendrimers and/or the promoted adhesive containing dendrimers can be applied on toner images totally, partially or not at all covered with release agent of the substrate.

In various embodiments, the liquid compositions of the adhesive primer containing dendrimers and/or the promoted adhesive containing dendrimers can be applied over the entire substrate, the entire image, parts of the substrate, or parts of the image. For example, the liquid composition can be applied to both imaged areas and non-imaged areas, only to imaged areas, or only to non-imaged areas. In embodiments, the liquid composition can be applied over the entire substrate, including toner imaged and non-imaged areas, to provide more uniform surface properties. The toner-based image on the substrate can have been previously prepared by any suitable xerographic process including, for example, generating an electrostatic image, developing the electrostatic image with toner, and transferring the developed toner-based image to a substrate, or modifications thereof, known in the art of xerography.

Liquid film coating devices can be used for applying the liquid compositions of the adhesive primer containing dendrimers and/or the promoted adhesive containing dendrimers, including spray coaters, roll coaters, rod coaters, blades, wire bars, air-knives, curtain coaters, slide coaters, doctor-knives, screen coaters, gravure coaters, such as, for example, offset gravure coaters, slot coaters, and extrusion coaters. Such devices may be used in a known manner, such as, for example, direct and reverse roll coating, offset gravure, curtain coating, lithographic coating, screen coating, and gravure coating. In embodiments, coating of the liquid compositions can be accomplished using a two or three roll coater.

In embodiments, the liquid compositions of the adhesive primer containing dendrimers and/or the promoted adhesive containing dendrimers can be able to uniformly coat over any portion of fused toner-based images that have been covered with a fuser oil. The liquid compositions can also be effectively used with xerographic machines or offset prints free of fuser oil.

In embodiments, the liquid compositions of the adhesive primer containing dendrimers and/or the promoted adhesive containing dendrimers can be dried upon application to the substrate and on exposure to, for example, heat and/or air. For example, the drying process can be conducted at slightly elevated temperatures, for example above 15° C. In embodiments, the liquid composition can be dried at temperatures from about 15° C. to about 90° C., or from about 20° C. to about 80° C., or from about 25° C. to about 60° C.

In various embodiments, the firmly adhered adhesive formed by the method 300 or 400 can be associated with a second substrate (see 150 in FIG. 1A or 2A), for example, a book binding material, a POST-IT®, and the like, and bind the second substrate with the provided substrate having low SFE.

EXAMPLES

Example 1

Substrates or Prints with Low SFE

The exemplary substrate included an un-printed substrate and a printed substrate or a print generated on iGen3 with Fuser Fluid I or Fuser Fluid II as known in the art. The substrate included an oil contaminated paper sheet, printed or unprinted. The oil rate was from about 9 to about 12 mg per copy (letter size 8.5"×11") using inductively coupled plasma (ICP). The paper selected was the extreme paper of 10 pt Productolith C1S. This paper substrate can not be bonded to any commercially available hot melt adhesives on the unprinted side for both cases using Fluid I and Fluid II oil.

Example 2

Dendrimers used for Adhesive Primers and/or Promoted Adhesives

Four dendrimers were used as examples.

Dendrimer 1: polypropylenimine tetramine dendrimer (DAB-Am-4 or DAB(PA)$_4$) of generation 1, purchased from Sigma-Aldrich (St. Louis, Mo.) with a catalog number of 460699 having a chemical formula as following:

46,069-9

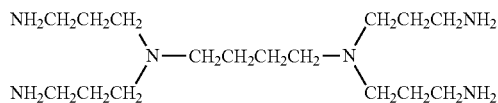

Dendrimer 2: starburst (PAMAM) dendrimer having an ethylenediamine core of generation 0.0 solution, purchased from Sigma-Aldrich (St. Louis, Mo.) with a catalog number of 412368. The chemical formula is shown as following:

41,236-8

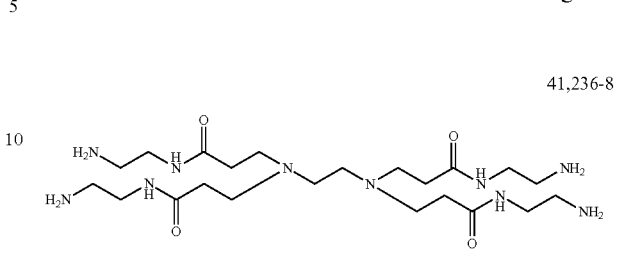

Dendrimer 3: polyetherhydroxyamine dendrimer of generation 1 having amine functionality (DNT-2300), available from Dendritic Nanotechnologies, Inc. (Mount Pleasant, Mich.) having a chemical formula of:

DNT-2300

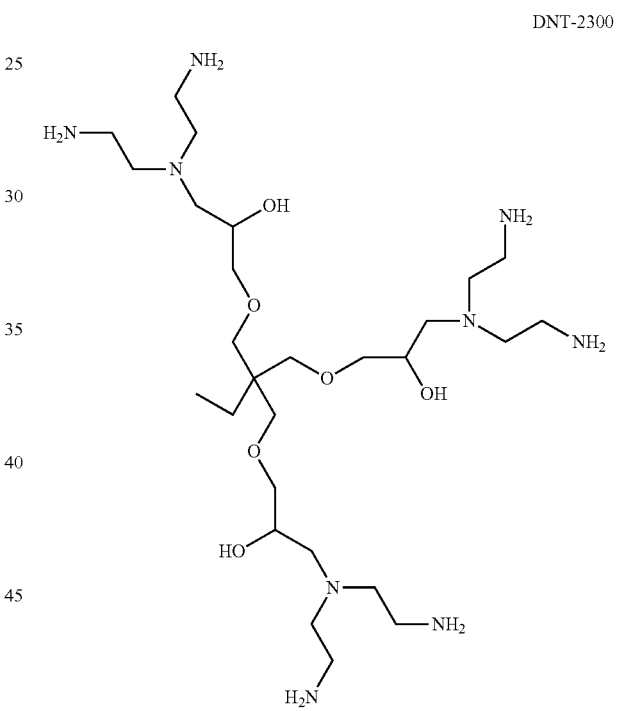

This dendrimer is a precise synthetic polymer with amine functionality architected in a spherical polyvalent configuration, which makes every functional group available for reaction and interaction. Typically, this product is used to improve adhesion to hydrophobic surfaces at low additive levels. The viscosity at 80° C. is only 1000-2000 cps and the heat stability can be as high as 300° C., which is suitable for hot melt application with hot pot temperature of about 110° C. to about 180° C.

Dendrimer 4: polypropylenimine tetrahexacontaamine dendrimer DAB(PA)$_{64}$ was also used as an adhesive primer on the surface of the paper or as an adhesion promoter in a promoted additive. This dendrimer has a dendrimeric structure illustrated as following:

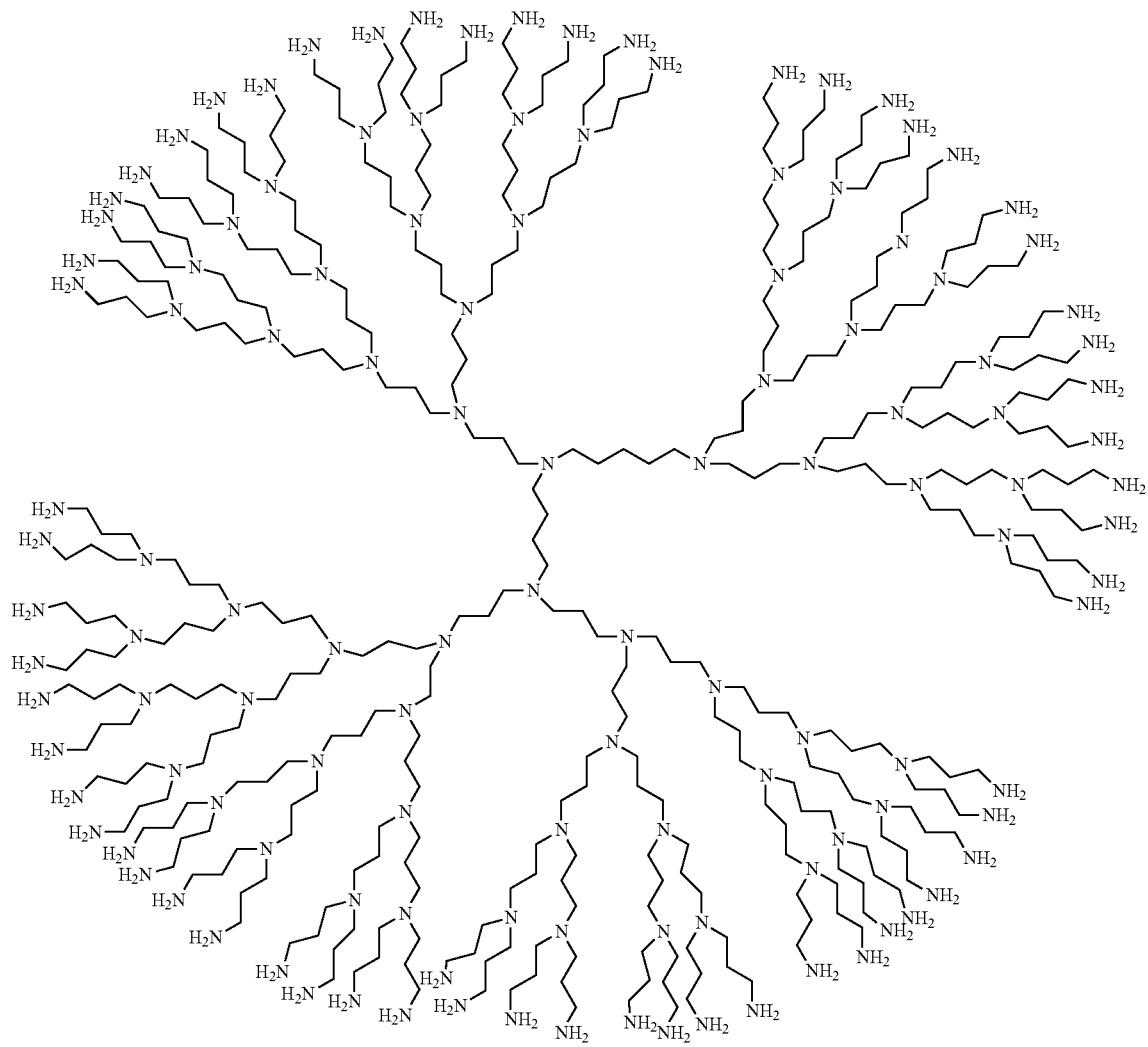

Example 3

Reduced Contact Angle After Applying Dendrimer as Adhesive Primers on Substrates of Example 1

Table 1 shows the contact angle results before and after the dendrimer was applied manually on the surface of the substrates of Example 1 using rectangle head swab. The contact angle was measured by using Fibro DAT110 instrument on three kinds of solvents including water (W), formamide (F), and diiodomethane (Diio) before and after the dendrimer adhesive primers were applied at 0.1 second, 1 second, and 10 seconds. Table 1 exemplarily shows contact angle results with different solvent after an application time of about 0.1 second and about 10 seconds.

TABLE 1

|  | 0.1 s-W | 10 s-W | 0.1 s-F | 10 s-F | 0.1 s-Diio | 10 s-Diio |
|---|---|---|---|---|---|---|
| Unprinted + Fluid I | 97.2 | 91.2 | 101.1 | 81 | 90.5 | 86.9 |
| Print + Fluid I + Dendrimer 1 | 39.7 | 25.6 | 69.9 | 40.9 | 44.6 | 43.5 |
| Print + Fluid I + Dendrimer 2 | 67.7 | 59.5 | 77.5 | 40.7 | 74.9 | 71.5 |
| Print + Fluid II | 117.4 | 113.6 | 109.1 | 103.3 | 89.6 | 88.2 |
| Print + Fluid II + Dendrimer 1 | 44.6 | 32.0 | 74 | 49.6 | 62 | 60.3 |
| Print + Fluid II + Dendrimer 2 | 92.8 | 91.6 | 92.6 | 79.9 | 76 | 74.2 |

As indicated by Table 1, the contact angle with water, formamide and Diio of each sample was dramatically reduced after the dendrimer adhesive promoter was applied at various time lengths.

Example 4

Increased SFE After Applying Dendrimer Adhesive Primers

Table 2 shows surface free energy (SFE) results before and after the dendrimer was applied manually on the surface of the substrates of Example 1 at 0.1 second, 1 second, and 10 seconds using rectangle head swab. The surface free energy (SFE) was calculated based on a known Lewis acid-base method using the contact angle results shown in Table 1.

TABLE 2

|  | 0.1 s (mN/m) | 1 s (mN/m) | 10 s (mN/m) |
|---|---|---|---|
| Unprinted + Fluid I | 17.5 | 13.7 | 19.2 |
| Print + Fluid I + Dendrimer 1 | 75.1 | 60.7 | 39.2 |
| Print + Fluid I + Dendrimer 2 | 24.1 | 33.0 | 42.1 |
| Print + Fluid II | 15.0 | 14.8 | 14.6 |
| Print + Fluid II + Dendrimer 1 | 53.8 | 43.4 | 34.6 |
| Print + Fluid II + Dendrimer 2 | 25.8 | 20.8 | 22.1 |

As indicated by Table 2, the surface free energy was dramatically increased after the dendrimer adhesive primer was applied on either unprinted papers or printed papers (i.e., print).

Example 5

Gluability: Fiber Tear Results Before and After Applying Dendrimer Adhesive Primers Gluability or the percentage of fiber tear was tested by using a home made gluability tester that includes two parts—draw down coater and laminator. Coater plate was also separated into two parts. Only the top part was heated up to the glue application temperature. The bottom part was kept at room temperature.

Around 3-4 grams of glue was heated up to around 175° C. with the viscosity around 4000 Centipoises. The glue was then manually applied to the surface of the substrates of Example 1 using meyer rod at a set speed. A corresponding piece of the same page was placed on top of the liquid adhesive within a few seconds and a sandwich structure was formed. The sandwich was placed under the sealer immediately under a compression pressure of about 5 psi for a period of 3 seconds, then removed and then allowed to cool. The compression area was about one inch wide and about 5 inches long.

The compression area was cut and fiber tear was measured by manually separating the pieces of the sandwich and visually inspecting the results, wherein 0% means there is no adhesion or no paper fiber tear, which is not desirable, and 100% means a complete adhesion, which is desirable. Two specimens were tested on each substrate and the average value was shown in Table 3. Specifically, Table 3 shows fiber tear results of substrates before and after the dendrimer applied as adhesive primers.

TABLE 3

|  | Fiber Tear (%) Test-1 | Fiber Tear (%) Test-2 | Fiber Tear (%) Average |
|---|---|---|---|
| Unprinted + Fluid I | 0 | 0 | 0 |
| Print + Fluid I + Dendrimer 1 | 100 | 100 | 100 |
| Print + Fluid I + Dendrimer 2 | 95 | 100 | 97.5 |
| Print + Fluid II | 0 | 0 | 0 |
| Print + Fluid II + Dendrimer 1 | 100 | 100 | 100 |
| Print + Fluid II + Dendrimer 2 | 90 | 85 | 87.5 |

As indicated by Table 3, the gluability was dramatically improved after the dendrimer was applied on the substrates of Example 1, printed or unprinted. The improved gluability was consistent with the reduced contact angles and the increased SFEs as described in Table 1 and Table 2.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A bonded article comprising:
an adhesive;
a first substrate comprising at least one xerographic print on at least one of a paper sheet, a plastic film, a pre-print form, and a transparency;

a second substrate, wherein at least a portion of the second substrate is bonded to the first substrate with the adhesive; and at least one dendrimer incorporated with the adhesive that bonds the first substrate to the second substrate, wherein the at least one dendrimer comprises an amino end group.

2. The bonded article of claim 1, wherein the adhesive is selected from the group consisting of a hot melt adhesive, a pressure sensitive adhesive and a combination thereof.

3. The bonded article of claim 1, wherein the at least one dendrimer is selected from the group consisting of a polypropylenimine dendrimer, a polyamidoamine dendrimer, a polyetherhydroxyamine dendrimer, and a mixture thereof.

4. The bonded article of claim 1, wherein the at least one dendrimer is selected from the group consisting of polypropylenimine tetramine dendrimer (DAB(PA)$_4$) with 1 generation, polypropylenimine tetrahexacontaamine dendrimer DAB (PA)$_{64}$ with 5 generations, starburst polyamidoamine dendrimer having ethylenediamine core, polyetherhydroxyamine dendrimer with 1 generation, and a mixture thereof.

5. The bonded article of claim 1, wherein the incorporated at least one dendrimer forms a dendrimer layer disposed between the first substrate and the adhesive, wherein the dendrimer layer at least partially covers the first substrate to increase the surface free energy to at least about 30 mN/m.

6. The bonded article of claim 5, wherein the dendrimer layer has a thickness ranging from about 0.1 micron to about 5 microns.

7. The bonded article of claim 1, wherein the at least one dendrimer is incorporated with the adhesive to form a promoted adhesive at least partially covering the first substrate.

8. The bonded article of claim 7, wherein the promoted adhesive has a thickness ranging from about 0.1 micron to about 10 microns.

9. The bonded article of claim 7, wherein the at least one dendrimer is present in an amount ranging from about 0.1% to about 10% by weight of the total promoted adhesive.

10. The bonded article of claim 1, wherein the second substrate is a book cover, the first substrate comprises multiple sheets of paper, and the first substrate is bonded to the second substrate by the adhesive and the at least one dendrimer.

11. The bonded article of claim 1, wherein the bonded article is a laminated article and the second substrate comprises a material selected from the group consisting of plastic, polyethylene, polypropylene, polyvinyl chloride (PVC), and polyester.

12. The bonded article of claim 1, wherein the first substrate has a surface free energy of less than about 35 mN/m and is at least partially covered by a release agent that is selected from the group consisting of functionalized silicone oil and nonfunctionalized silicone oil, wherein the functional silicon oil comprises at least one of an amino component and a mercapto component as a functional component.

13. A bonded article comprising:
a first substrate comprising at least one xerographic print on at least one of a paper sheet, a plastic film, a pre-print form, and a transparency;
a second substrates, and
a hot melt adhesive comprising an adhesive promoter at least partially covering the first substrate and bonding the first substrate to the second substrate,
wherein the adhesive promoter comprises at least one dendrimer comprising one or more amino end groups.

14. The bonded article of claim 13, wherein the hot melt adhesive is selected from the group consisting of polyparaffin, polyacrylate, polyester, poly(ethylene/vinyl acetate), polystyrene, polyamide, polyvinyl acetate, polyvinyl alcohol, polyalkylene oxide, natural rubber, phenol-formaldehyde resin of polymer, block copolymer based hot melt adhesive, and a mixture thereof.

15. The bonded article of claim 13, wherein the at least one dendrimer is selected from the group consisting of a polypropylenimine dendrimer, a polyamidoamine dendrimer, a polyetherhydroxyamine dendrimer, and a mixture thereof.

16. The bonded article of claim 13, wherein the at least one dendrimer is selected from the group consisting of polypropylenimine tetramine dendrimer (DAB(PA)$_4$) with 1 generation, polypropylenimine tetrahexacontaamine dendrimer DAB (PA)$_{64}$ with 5 generations, starburst polyamidoamine dendrimer having ethylenediamine core, polyetherhydroxyamine dendrimer with 1 generation, and a mixture thereof.

17. The bonded article of claim 13, wherein the at least one dendrimer is present in an amount ranging from about 0.1% to about 10% percent by the weight of the total hot melt adhesive.

* * * * *